US006581113B1

(12) United States Patent
Dwork et al.

(10) Patent No.: US 6,581,113 B1
(45) Date of Patent: Jun. 17, 2003

(54) APPARATUS AND METHOD FOR TRANSFERRING FRAME DATA BETWEEN A HOST SYSTEM MEMORY AND A NETWORK INTERFACE BUFFER MEMORY EMPLOYING TRANSMIT DESCRIPTORS WITHOUT TRANSMIT STATUS INFORMATION

(75) Inventors: Jeffrey Dwork, San Jose, CA (US); Robert Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/511,323

(22) Filed: Feb. 23, 2000

Related U.S. Application Data

(60) Provisional application No. 60/173,494, filed on Dec. 29, 1999.

(51) Int. Cl.$^7$ ............................................... G06F 13/00
(52) U.S. Cl. ........................... 710/52; 710/52; 710/53; 710/54; 710/55; 710/56; 710/57; 710/60
(58) Field of Search ............................. 710/53, 54, 52, 710/55, 56, 57, 60

(56) References Cited

U.S. PATENT DOCUMENTS

| 5,784,649 | A | * | 7/1998 | Begur et al. ................... 710/52 |
| 5,797,043 | A | * | 8/1998 | Lewis et al. ................... 710/56 |
| 5,960,215 | A | * | 9/1999 | Thomas et al. ................ 710/52 |
| 6,044,225 | A | * | 3/2000 | Spencer et al. ............... 710/52 |
| 6,219,727 | B1 | * | 4/2001 | Kailash et al. ................ 710/48 |

* cited by examiner

Primary Examiner—Jeffrey Gaffin
Assistant Examiner—Mohammad O. Farooq

(57) ABSTRACT

A network interface device and a method of transferring data between a host and a network medium employs transmit descriptors that do not contain transmit status information. Upon fetching a transmit data frame from a host system memory at a location pointed to by a transmit descriptor, the network interface device immediately generates an interrupt to the CPU to allow the CPU to re-use the buffers in which the data frame was stored. At the same time, the network interface device attempts transmissions of the data frame to the network medium. Transmit status information is kept in statistics counters on the network interface device.

10 Claims, 7 Drawing Sheets

APPARATUS AND METHOD FOR TRANSFERRING FRAME DATA BETWEEN A HOST SYSTEM MEMORY AND A NETWORK INTERFACE BUFFER MEMORY EMPLOYING TRANSMIT DESCRIPTORS WITHOUT TRANSMIT STATUS INFORMATION

RELATED APPLICATIONS

This application contains subject matter related to the subject matter disclosed in copending U.S. Provisional Patent Application Ser. No. 60/173,494, filed on Dec. 29, 1999.

FIELD OF THE INVENTION

The present invention relates to network interfacing and more particularly, to methods and systems for transferring data between a host system memory and a buffer memory in a network interface device configured for accessing Ethernet media, in a manner that employs transmit descriptors

BACKGROUND ART

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by the MAC, and receive data is stored in a receive FIFO by the MAC prior to transfer to the host computer via the host computer bus interface.

One disadvantage with the use of a FIFO for a transmit buffer or a receive buffer is the increased latency encountered during the buffering process. The latency of the network interface device is the time delay between the time that a data frame is supplied to the network interface device and the time the data is transmitted on the network media, or vice versa.

An additional problem caused by the buffering of data between the clock domain of the host computer and the clock domain of the network interface device is buffer overflow or underflow. For example, buffer overflow can occur when the time domains between the host bus and the network media are uncontrollable to the extent that data is stored in the buffer at a rate faster than the data can be removed, resulting in an overflow situation. Conversely, underflow occurs if data is removed from the FIFO buffer faster than the data can be supplied.

Hence, the non-synchronous relationship between the host bus clock domain and the network clock domain have required the necessity of FIFO buffers to compensate for timing discrepancies between the host computer and the network.

Network interface devices configured for transferring data between host system memory and the FIFO buffer using DMA transfers have typically used descriptor entries, stored in system memory, to provide information needed by the DMA management unit on the network interface device to transfer either transmit data or receive data between the system memory and the network interface device. In particular, the descriptor entries are typically organized as ring structures in system memory, and include one descriptor ring for transmit data and another descriptor ring for receive data. Each descriptor entry is used to describe a single buffer. Since a frame may occupy one or more buffers, multiple descriptor entries may be used to identify multiple buffers storing data for a given data frame. Hence, for each transfer of frame data (i.e., packet data), the network interface device needs to perform two DMA transfers from system memory, namely one DMA transfer to obtain descriptor information related to the frame data, and a second DMA transfer for the actual stored frame data.

Once the DMA controller in the network interface device has read the data from the system memory, it is transmitted over the network. After the data has been transmitted, the network interface device writes status information into the transmit descriptor stored in the system memory. The central processing unit (CPU) is then interrupted to return the data buffers to the CPU. Once the data buffers have been returned, the CPU may reuse those same data buffers for new frames to be transmitted.

One of the concerns in any communication system is that of communication speed. In the above-described systems, there is a period of time that passes between the receipt of the frame data by the network interface device from the system memory until the buffers are able to be reused by the central processing unit to process a different frame. Part of this time is due to the determination of the transmission status of that frame so that the status information may be written back to the transmit descriptor, with the freeing of the buffers occurring after the transmit descriptor has been updated with the status information.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

There is a need for a method and apparatus for transferring frame data between a host system memory and a network interface buffer memory employing transmit descriptors that operates in a faster manner to return buffers to a central processing unit for re-use with different frame data.

These and other needs are met by embodiments of the present invention which provide a method of transmitting data from a node on a network comprising the steps of reading a transmit descriptor from a memory to determine the location within the memory of data to be transmitted. The data to be transmitted is copied from the memory to a network interface controller. The location in the memory of the data is freed immediately after the copying of the data to the network interface controller, regardless of any transmission of the data from the node. Attempts are then made to transmit the data on the network from the network interface controller. Various statistics counters are updated on the network interface controller with transmission status information.

The present invention recognizes that due to the manner in which upper layer network protocols operate, status information is only used for statistics purposes. Therefore, the present invention does not wait until after the frame has been transmitted before returning the buffer to the CPU for re-use. This has the effect of returning the buffers as soon as possible and speeding up operation of the arrangement. This is especially important in instances which the network is operating in a half-duplex mode since multiple collisions may cause a delay of many milliseconds before the frame is actually transmitted. In prior art arrangements, the frame must be transmitted before the buffers are returned to the CPU. Instead, the buffers are returned to the CPU in the present invention as soon as the frame data has been copied to the network interface controller.

The earlier stated means are also met by another embodiment of the present invention which provides a network interface device for transferring data frames between a host system memory and network media. The network interface device includes a buffer memory and a memory controller configured for transferring data frames between a host system memory and the buffer memory. Transmission logic is configured to transmit the data frames from the buffer memory to the network media. The network interface device also includes statistics counters configured to store transmission status information.

Since the transmit descriptors are not written back with status information regarding the transmissions frame, the status information used for statistics purposes are kept in the statistics counters on the network interface device according to the present invention. In certain embodiments, the buffer memory is sized sufficiently to store a complete maximum length data frame. This is preferred since the locations in system memory are immediately freed upon the copying of the frame to the network interface device. Since collisions may force the frame to be re-transmitted, the network interface device should have a buffer memory large enough to hold a complete maximum-length frame.

Additional objects, advantages, and novel features of the invention will be set forth in part in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with an example of a network interface device in a packet switched network, such as an Ethernet (IEEE 802.3) network. A description will first be given of a network interface architecture, followed by the arrangement for transferring frame data between a host system memory and a network interface buffer memory. It will become apparent, however, that the present invention is also applicable to other network interface device systems. Another such system will be described later.

NETWORK INTERFACE ARCHITECTURE

Figure 1A:
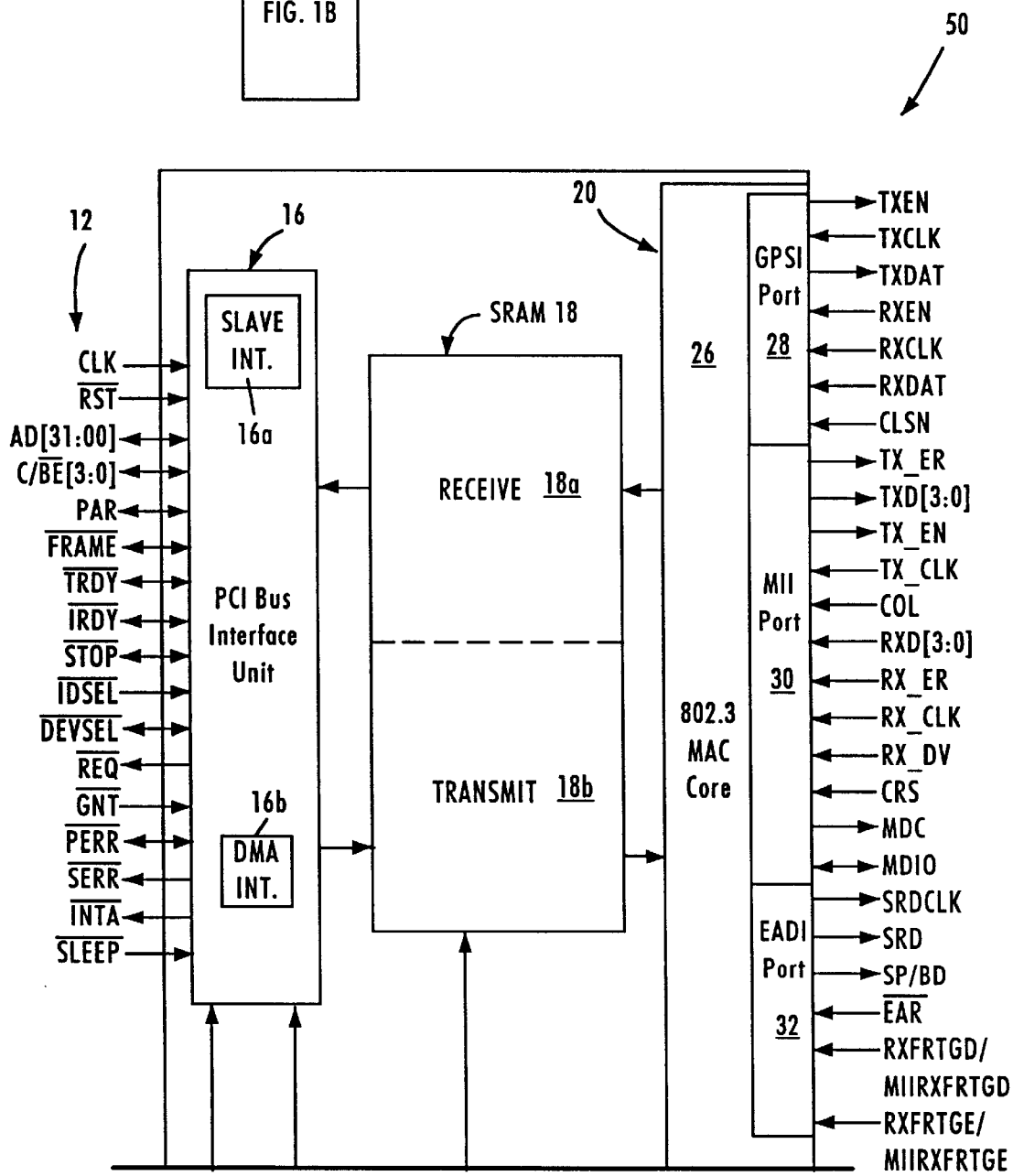
FIG. 1 is a block diagram illustrating an exemplary network interface device according to an embodiment of the present invention.
Figure 1B:
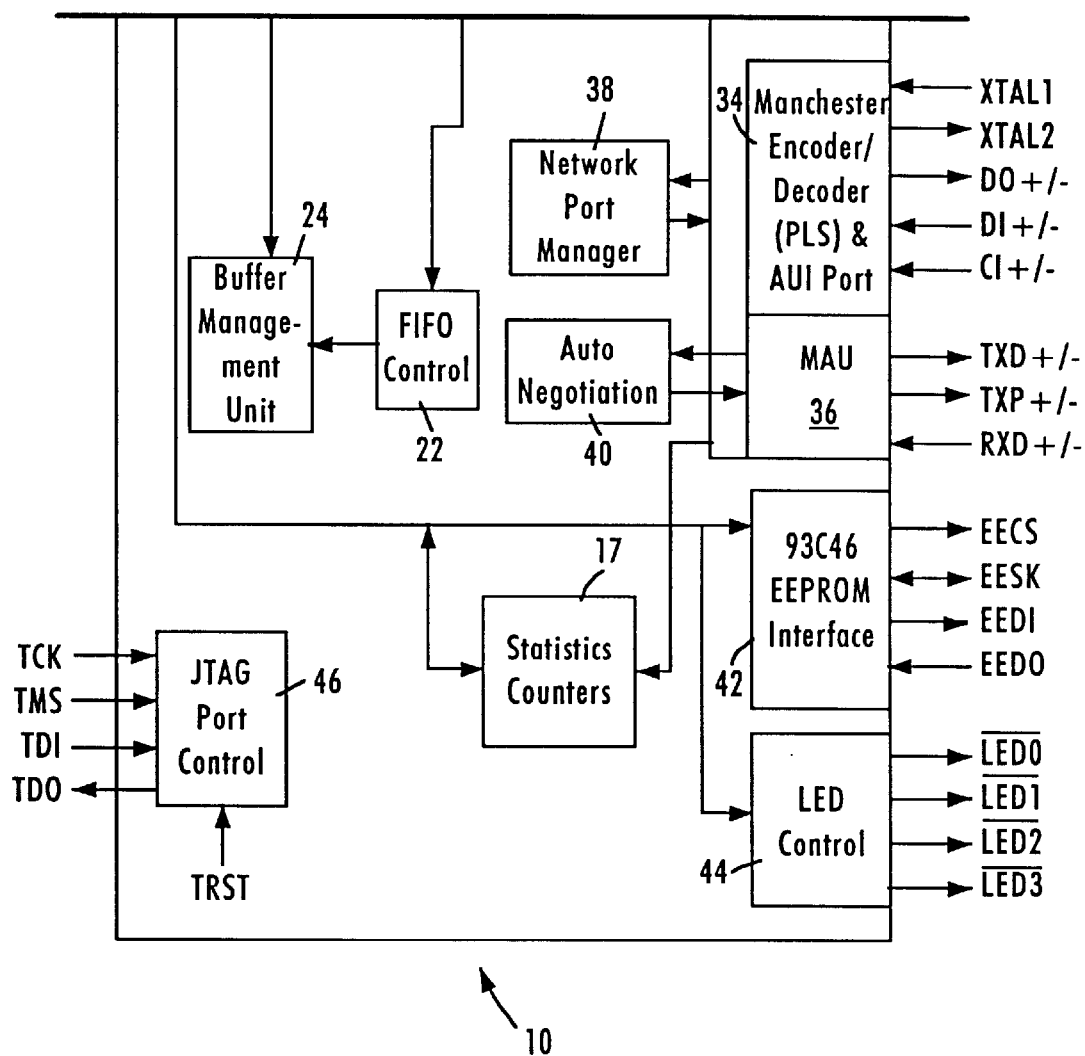

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethemet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18b for receive and transmit paths, respectively.

The network interface device 10 also includes a buffer management unit 24 that manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The network interface device 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-complaint negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface device status registers (not shown). The network interface device 10 also includes an IEEE 1149.1-complaint JTAG boundary scan test access port interface 36.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol.

MEMORY MANAGEMENT ARCHITECTURE

Figure 2:
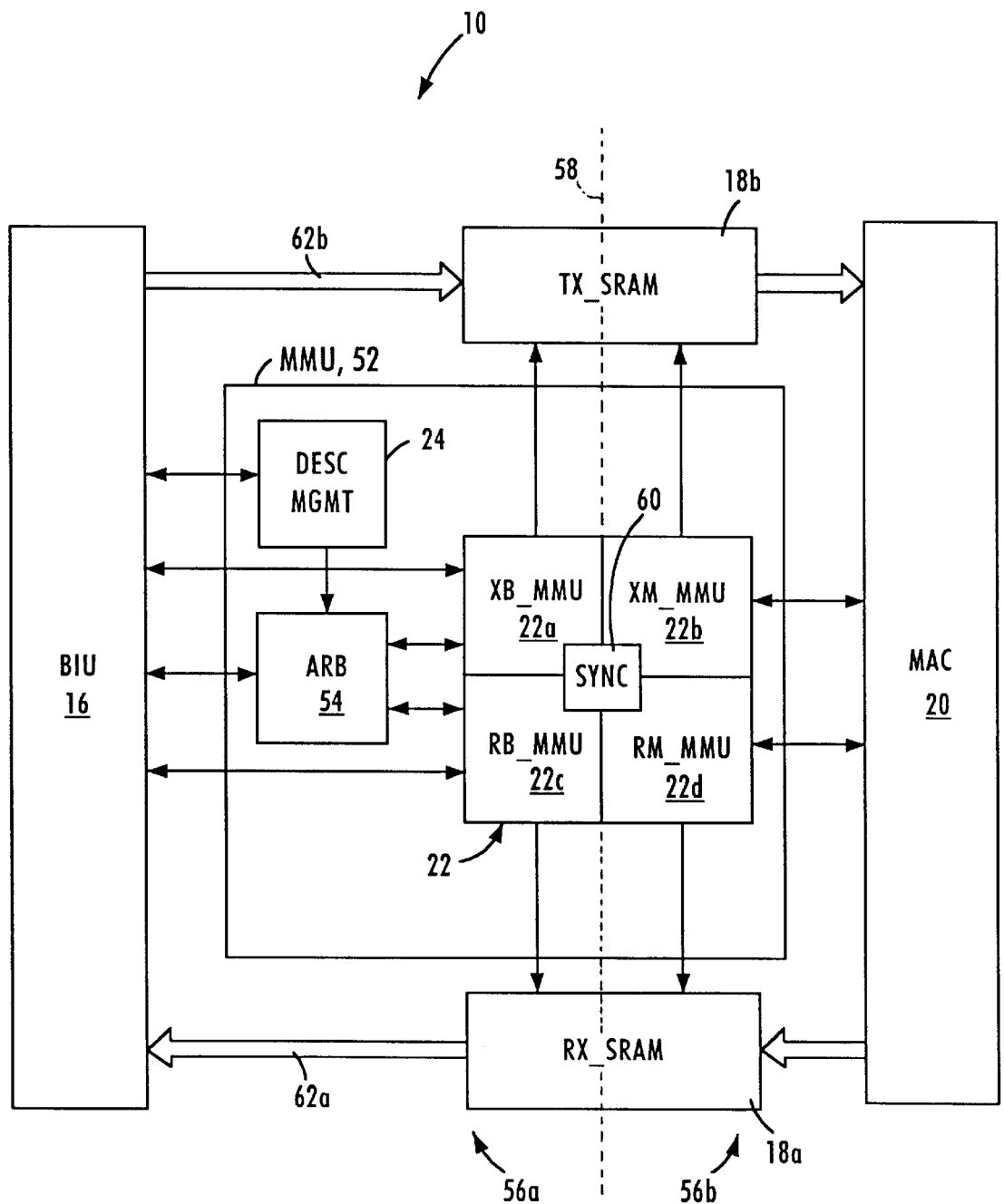
FIG. 2 is a block diagram illustrating the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations.

According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and the TX_SRAM 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

According to the disclosed embodiment, the synchronization circuit 60 includes a read counter and a write counter for each transmit SRAM 18b and receive SRAM 18a, where each counter is configured for counting a number of written (or read) frames by changing a single bit of a counter value in response to a corresponding signal from the associated MMU controller. Hence, the synchronization circuit 60 can asynchronously determine the number of stored frames in the RX_SRAM 18a and the TX_SRAM 18b, as well as the amount of free space in the TX_SRAM 18b or stored data bytes in the RX_SRAM 18a.

DESCRIPTOR MANAGEMENT

Descriptor data elements are used by the network interface device 10 to control the transfer of frame data between the host system memory and the network interface buffer memory 18. As described below, a software driver executable by the host CPU controls the writing of transmit data into system memory. Storage of the transmit frame data and receive frame data in the host system memory is controlled by the software driver, which writes descriptor lists in system memory, where each descriptor list includes at least one descriptor data element identifying at least a portion of frame data stored (or to be stored) in system memory. Once the system driver writes the descriptor lists in host memory, the driver releases the descriptor lists to the network interface device 10, described below, enabling the network interface device 10 to fetch the descriptor data element in order to identify the appropriate location and conditions for transmit data. As will be described in more detail later, once the network interface device 10 has received the complete data frame based on the corresponding descriptor data elements, the network interface device releases the descriptor data elements, described below, enabling the software driver to update the descriptor lists in system memory for new frame data. There is no waiting for the network interface device 10 to complete transmission of the frame data to the network medium.

Figure 3:
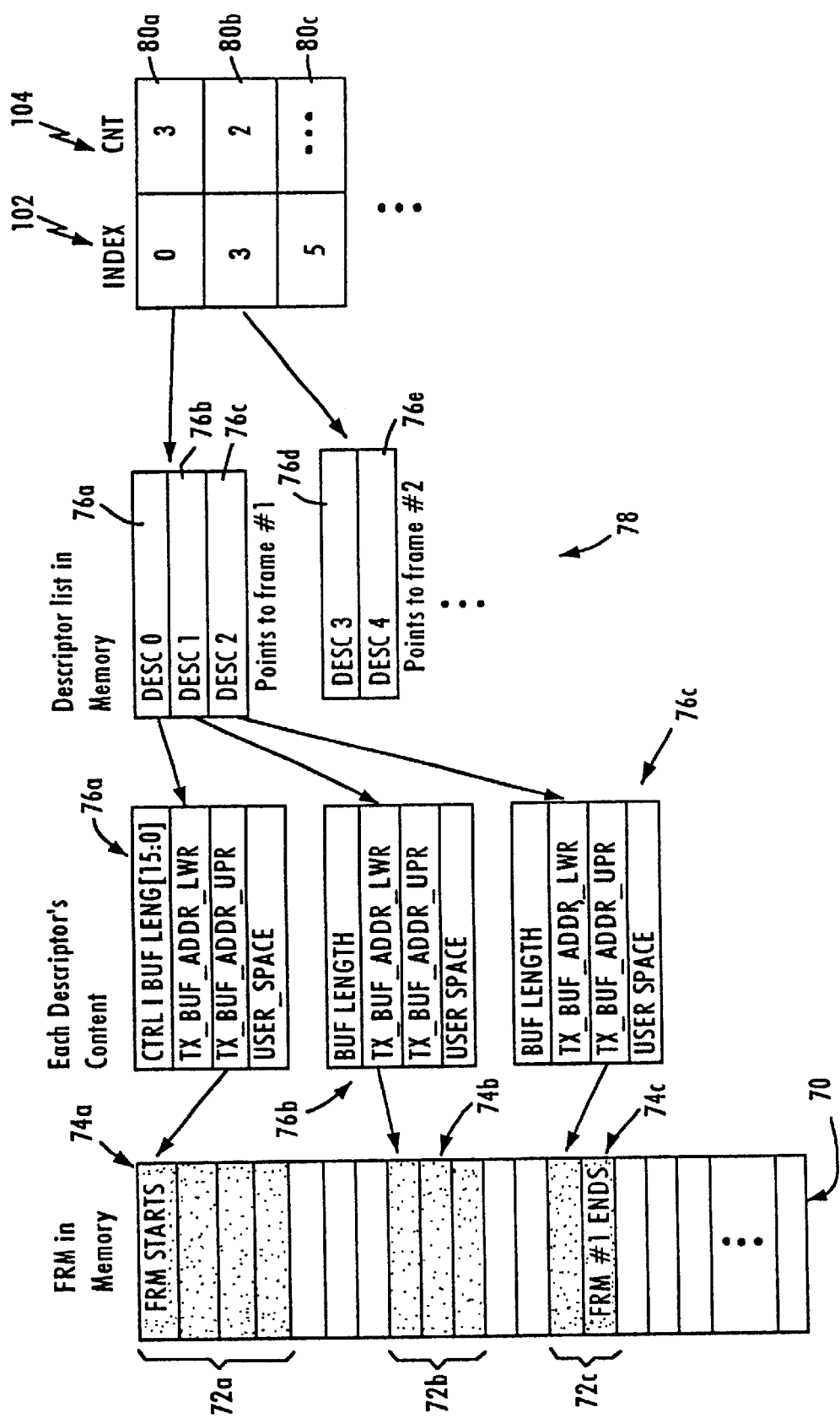
FIG. 3 is a diagram illustrating a relational structure between received descriptor index data, descriptor data elements, and frame data transferred by the network interface according to an embodiment of the present invention.

FIG. 3 is a diagram illustrating the relationship between descriptor data elements, frame data, and descriptor index data used by the network interface device 10 to fetch the descriptor data elements, according to an embodiment of the present invention.

As shown in FIG. 3, a system memory 70 includes frame data 74 at system memory locations 72. The frame data may be fragmented into a plurality of portions 74a, 74b, 74c, such that each frame data fragment 74 has its own corresponding system memory location 72. Each frame data fragment 74 has a corresponding descriptor data element 76. Hence, the descriptor data elements 76a, 76b, and 76c point to respective frame data fragments 74a, 74b, 74c. The descriptor management unit 24 uses the descriptor data elements 76a, 76b, and 76c to fetch the first transmit frame 74 from the respective memory location 72a, 72b, and 72c.

According to the disclosed embodiment, each of the descriptors 76 are stored in contiguous memory locations in the system memory 78. Hence, the system driver, upon writing the descriptor data elements 76 into system memory 78, releases the control over the descriptor data elements 76 by writing descriptor index data 80 to a register on the MMU 52 indicating that the descriptors 76 are available.

Figure 4:
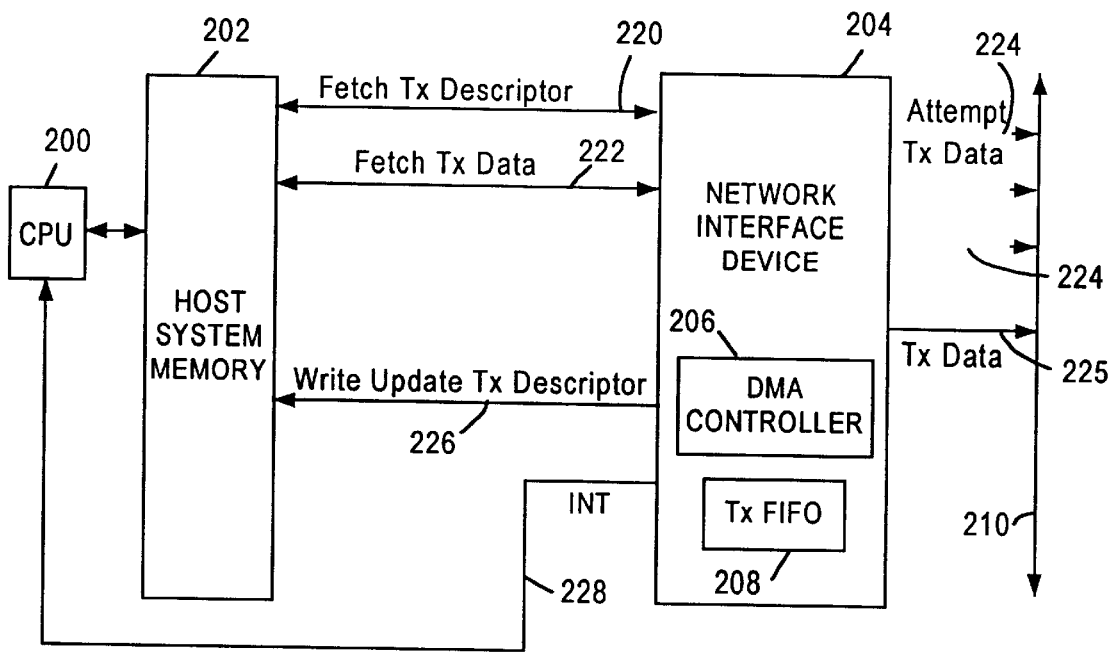
FIG. 4 is a block diagram of a prior art arrangement schematically depicting a sequence of operations between the various components of the arrangement.
Figure 5:
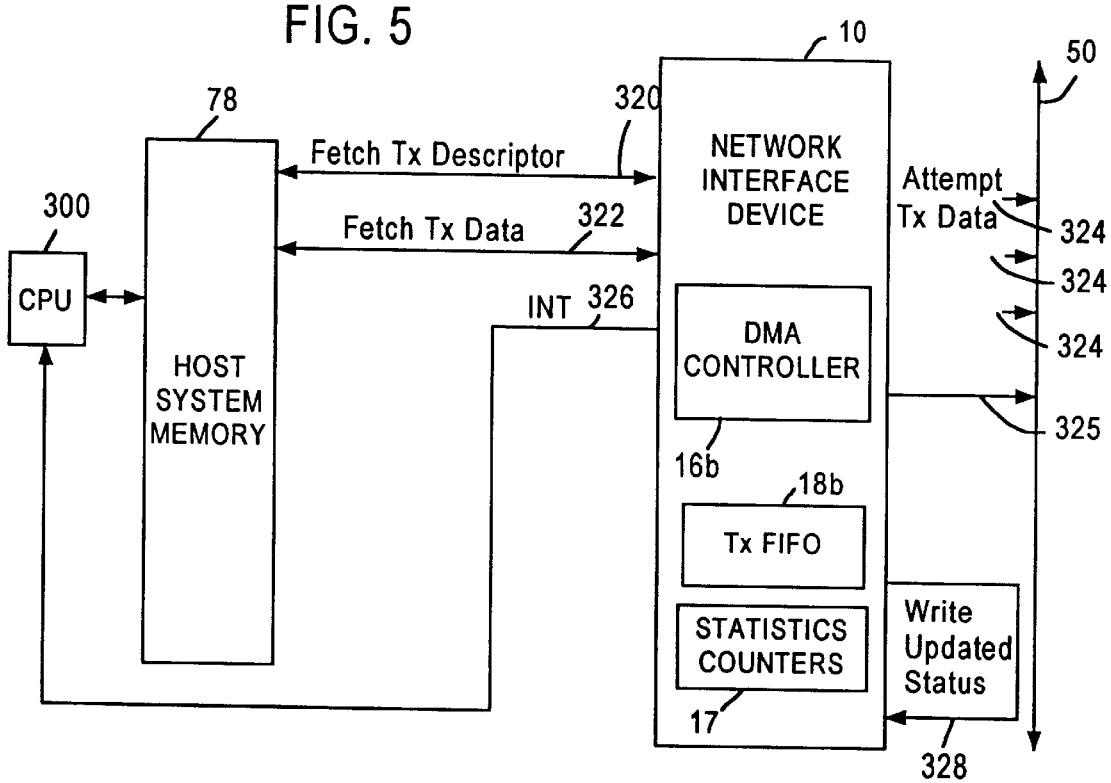
FIG. 5 is a block diagram of a network arrangement in accordance with the embodiments of the present invention, with a schematically indicated sequence of operations between the various components of the inventive arrangement.

The configuration of the system memory as described in FIG. 3 is exemplary only, however, and the arrangement of the frames and the descriptor lists in the system memory may be changed in accordance with embodiments of the present invention. One of the features recognizable within the schematic depiction of the descriptors 76a–76c in FIG. 3 is that each the descriptor does not contain status information. In conventional descriptors, the status information relating to the transmission status of the frame is written into a descriptor following the transmission or discarding of a frame by the network interface device. FIGS. 4 and 5 are block diagrams with schematic indications of operations performed in a timing sequence that permits comparison of the present invention of the prior art for ease of understanding.

FIG. 4 depicts a prior art arrangement in which a host CPU 200 is coupled to a host system memory 202 and a network interface device 204. The host system memory 202 contains data frames and transmit descriptors. In accordance with prior art methodologies and arrangements, transmit descriptors within the host system memory may include the status information provided by the network interface device 204 when the transmit descriptor is updated by the network interface device 204.

The sequencing of the operations may be considered to occur in the arrangement as they are depicted from top to bottom in prior art FIG. 4. Hence, the first step in the prior art method of transmitting a data frame to the network 210 is the fetching of a transmit descriptor to 220 by the network interface device 204 from the host system memory 202. Once the DMA controller 206 has fetched the transmit descriptor from the host system memory 202, the DMA controller 206 then reads the transmit data frame in step 222 from the host system memory 202. The transmit data frame, or portions thereof, are placed into a transmit, first in, first out (FIFO) buffer 208 for transmission onto the network 210. The data is read from the host system memory 222 at the location pointed to by the transmit descriptor 220.

Once the data frame, or portions thereof, have been copied into the transmit FIFO 208, attempts are made at transmission, as indicated by solid arrow 224, of the data frame onto the network medium 210. A number of transmissions may be required since in half-duplex mode, for example, multiple collisions may occur before the frame can actually be transmitted. The transmission of the frame is indicated by solid arrow 225.

Following the transmission of the data frame onto the network medium 210, the network interface device 204 writes status information back to the transmit descriptor in host memory 202. This is indicated by the arrow 226. Hence, the transmit descriptor in the host system memory 202 for the data frame that was just transmitted by the network interface device 204 contains the status information relating to the transmission of that frame. The host CPU may read this information for statistics purposes.

After the transmit descriptor has been updated in the host system memory 202 (step 226), the buffers of the host system memory 202 which store the data frame that was just transmitted may be released for re-use for another data frame. To accomplish this, the network interface device 204 interrupts the CPU, as indicated by reference arrow 228 in FIG. 4. This interruption informs the CPU that the data buffers are free and that the transmit descriptor has been written to contain the status information regarding the transmission of the data frame.

The present invention recognizes that, due to the way the upper layer network protocols operate, status information is only used for statistical purposes. It is therefore not necessary to wait until the data frame has been transmitted before returning the buffers to the CPU. In fact, this waiting is counterproductive as it ties up the data buffers in the host system memory 202 longer than is absolutely necessary.

FIG. 5 depicts an arrangement, in accordance with embodiments of the present invention, which provides a faster return of the buffers to the host CPU for reuse in storing other data frames, and avoids the re-writing of the transmit descriptor to include status information. In the arrangement in FIG. 5, the host CPU 300 is connected to the host system memory 78, and both components are coupled to the network interface device 10. The network medium 50 is coupled to the network interface device 10.

The same convention is applied in FIG. 5 as in FIG. 4 regarding the sequence of events occurring in a transfer of a data frame. In other words, the first operation that is performed is the fetch of a transmit descriptor from the host system memory 78 by the network interface device 10, as controlled by the DMA controller 16b. This operation is depicted schematically in FIG. 5 as arrow 320. As in the prior art system of FIG. 4, the data frame to be transmitted, as pointed to by the transmit descriptor that was fetched, is copied into the transmit FIFO 18b by the DMA controller 16b from the host system memory 78. This operation is referenced by numeral 322.

In preferred embodiments of the present invention, the transmit FIFO 18b is a buffer memory that is configured to hold a maximum length data frame completely within the transmit FIFO 18b. The maximum length of a data frame is defined by the network system. It is important to have a transmit FIFO 18b that is configured to hold the complete data frame, as the buffers within the host system memory 78 that hold the data frame will be immediately released. Therefore, if there is a collision, (e.g., in half-duplex mode, for example) then there would be no other copy of the data frame for another attempted transmission.

After the data frame has been completely copied into the transmit FIFO 18b, the DMA controller of the 16b network interface 10 causes two operations to occur simultaneously or closely following one another. The operations include the attempted transmission indicated by dashed arrow 324 of the data frame onto the network medium 50, and the sending of the interrupt signal 326 to the host CPU 300. The interrupt signal 326 informs the host CPU 300 that the buffers which hold the data frame in the host system memory 78 are available for re-use. This interrupt signal 326 is sent out regardless of the transmission of the data from the node. Hence, the freeing of the location in the memory 78 occurs immediately after the copying of the data to the network interface device 10. There is no waiting by the host CPU 300 for one or multiple transmission attempts before the host CPU 300 can re-use the buffers. Furthermore, the host CPU 300 does not have to wait for the updating of the transmit descriptor by the writing of the status information into the transmit descriptor stored in host system memory 78.

The example of FIG. 5 depicts a number of attempts 324 at transmission before the data frame is transmitted in operation 325. This may occur, for example, in half-duplex mode when there can be multiple collisions before the transmission may occur without collision. Since the host CPU 300 is not able to obtain status information from the transmit descriptors in the host system memory 78, as the transmit descriptors did not contain this information, the statistics information is kept within a set of statistics counters 17 provided on the network interface device 10. The statistics counters 17 may be updated after each unsuccessful transmission 324 or successful transmission 325. The operation to write the updated status in the statistics counters is 17 indicated by reference arrow 328. The information in the statistics counters 17 can be obtained when desired by the host CPU 300.

Figure 6:
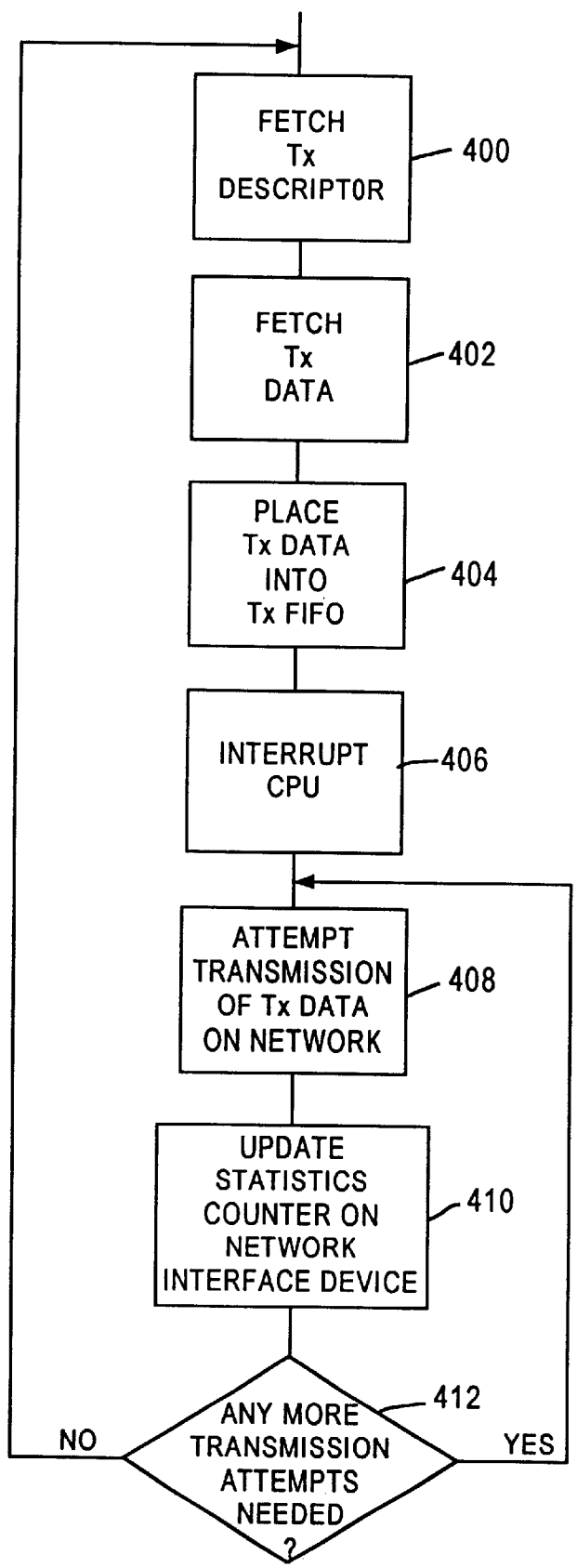
FIG. 6 is a flow diagram of an exemplary embodiment of the method of the present invention.

FIG. 6 depicts a simplified flow diagram of a method of the present invention. In the first step 400, the transmit descriptor of the data frame to be transmitted is retrieved by the DMA controller 16b of the network interface device 10. The DMA controller 16b then retrieves the corresponding transmit data frame, in step 402, from the host system memory 78. All of the data in the complete data frame is copied from the host system memory 78 into the transmit FIFO 18b in step 404. Once a complete data frame has been copied into the transmit FIFO 18b, the buffers in the host system memory 78 may be freed for re-use by the CPU 300. Accordingly, the CPU is interrupted in steps 406 by the network interface device 10 to inform the host CPU 300 that the system memory buffers are free.

At approximately the same time as the network interface device 10 is generating an interrupt to the CPU (step 406), network interface device 10 attempts transmission of the transmit data frame from the transmit FIFO 18b onto the network medium 50. This is depicted in step 408. The statistics counters 17 on board the network interface device 10 are then updated in step 410 to reflect the attempted transmission. It is then determined in step 412 whether any more transmission attempts need to be made. If there are no more attempts (e.g., the data frame needs to be discarded or a successful transmission has been made), then the process returns to the step 400 to fetch a new transmit descriptor. If more transmission attempts are to be made, the process returns to step 408, as indicated in FIG. 6.

Figure 7:
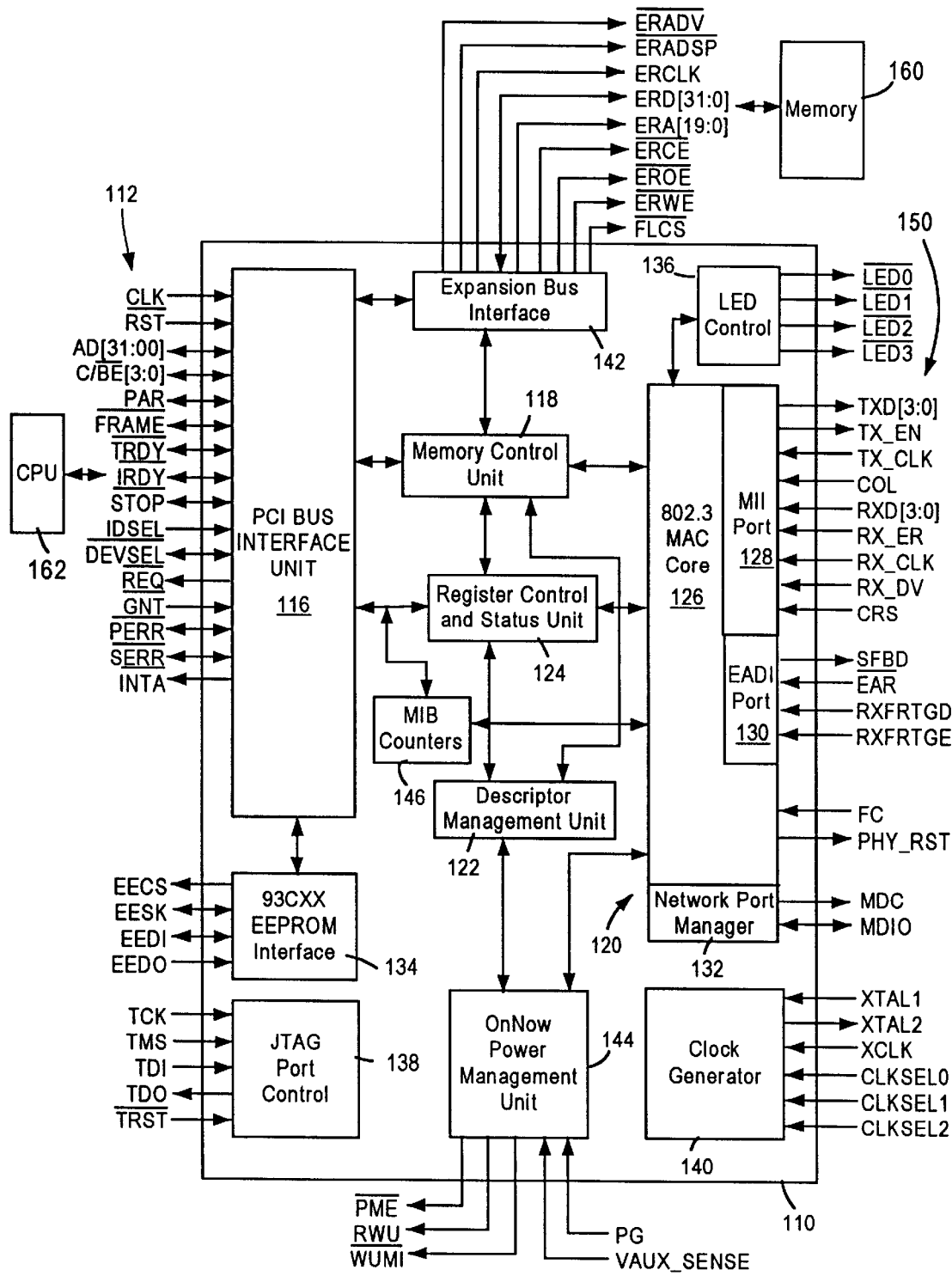
FIG. 7 is a block diagram depicting an exemplary network interface controller according to an embodiment of the present invention.

FIG. 7 is a block diagram of an exemplary embodiment of a network interface controller constructed in accordance with an embodiment of the present invention. The network interface controller is described in the context of a IEEE 802.3 compliant network interface configured for sending and receiving data packets between a system memory and a network medium using established media access control (MAC) and physical layer (PHY) protocols. This network interface controller is another example of a network interface device that implements the present invention of transferring frame data employing transmit descriptors without transmit status information. It should be understood that the transfer of frame data occurs in the same manner as that described earlier with respect to the embodiment of FIGS. 1–3.

The network interface 110, preferably a single-chip, 32-bit Ethernet controller, provides an interface between a local bus 112 of a computer, a peripheral component interconnect (PCI) local bus, for example, and an Ethernet-based media 150. The reference numeral 150 identifies either an actual network medium, or alternately a signal path (e.g., a media independent interface (MII)) to a physical layer transceiver coupled to the network media.

The network interface 110 includes a PCI bus interface unit 116, and memory control unit 118, a network interface portion 120, a descriptor management unit 122 and a register control and status unit 124. The network interface portion 120 includes an IEEE 802.3 compliant and full-duplex capable media access control (MAC) core 126, a media independent interface (MII) port 128 for connecting external 10 megabit per second, 100 megabit per second, or 1000 megabit per second transceivers, an external address detection interface (EADI) port 130, and a network port manager unit 132. The network interface 110 also includes an EEPROM interface 134 for reading from and writing to an external EEPROM, an LED control 136, an IEEE 1149.1-compliant JTAG boundary scan test access port interface 138, a clock generation unit 140, and an expansion bus 142. The expansion bus interface unit 142 interfaces to an external data memory 160 for frame data storage, control data storage and status data storage. The expansion interface unit 142 also interfaces to non-volatile (e.g., EEPROM or Flash memory) storage for boot ROM used during start-up.

The PCI bus interface unit 116, compliant with the PCI local bus specification (revision 2.2), receives data frames from a host computer memory via PCI bus 112. The PCI bus interface unit 116, under the control of the descriptor management unit 122, receives transfers from the host computer via the PCI bus 112. For example, transmit data received from the PCI bus interface unit 116 is passed to the memory control unit 118 which stores it in the data memory. Subsequently, the memory control unit 118 retrieves the transmit data from the data memory and passes it to the MAC 126 for eventual transmission to the network. Similarly, received data from the network 150 is processed by the MAC 126 and passed to the memory control unit 118 for storage in the data memory 160. Subsequently, the memory control unit 118 receives the data from the data memory 116 passes it to the PCI bus interface unit 116 for a transfer to the host computer 162 via the PCI bus 112.

The descriptor management unit 122 manages the transfers of data to and from the host computer 162 via the PCI bus interface unit 116. Data structures contained in the memory of the host computer 162 specify the size and location of the data buffers along with various control and status information. The descriptor management unit 122 interfaces with the memory control unit 118 to insert control information into the transmitted data stream and to retrieve status information from the received data stream. The network interface portion 120 includes the network port manager 132 that performs auto-negotiation functions by communicating via the media 150 with a corresponding auto-negotiation unit in the link partner (e.g., the centralized hub, repeater, work station, or switch).

The network interface 110 also includes a power management unit 144 that enables remote activation (i.e., turn-on) of the host computer 162 via the network medium 150 by detecting a predetermined pattern on the medium 150 according to Microsoft On Now and ACPI specifications, including compliance with Magic Packet technology and PCI bus power management interface specification protocols.

The network interface 110 also includes a MIB counter unit 146 which accepts information from the MAC 126 regarding frame transmission and reception and maintains the statistics necessary for network management. The statistics are accessed by the host computer 162 via the PCI bus interface unit 116.

The return of the transmit buffers before transmit status is available in the embodiment of FIG. 7 is similar to that described for the embodiment of FIGS. 1–3. A difference in descriptor processing between the two embodiments is that in FIG. 7, the CPU does not write to index and buffer count registers. Instead, the CPU 162 sets an OWN bit in the transmit descriptor and optionally writes to a bit in the Network interface 110 that causes the network interface 110 to poll the descriptor immediately.

The present invention improves the performance of arrangements used to transfer frame data between a host system and a network medium, in part, by removing status information from the transmit descriptors employed in the transfer operation. Since transmission status information is no longer written to the transmit descriptor, stored in system memory, the network interface device does not have to wait for completion of the transmission of a data frame prior to interrupting the CPU to allow re-use of the buffers which are currently storing the data frame. This has the benefit of increasing system performance in comparison to prior art arrangements.

Although of this invention that has been described in connection with what is considered to be the most practical and preferred embodiments, it is to be understood that the invention is not limited to the disclosed embodiments, but on the contrary, is intended to cover various modifications and equivalent arrangements included within the scope of the appended claims.

What is claimed is:

1. A method of transmitting data from a node network comprising:

reading a transmit descriptor from a random access memory (RAM) to determine a location within the RAM of a data frame to be transmitted, the transmit descriptors indicating length of and the location in the RAM of the data frame to be transmitted;

copying the data frame to be transmitted to a first-in-first-out (FIFO) buffer in a network interface device, the FIFO buffer configured to buffer a complete maximum length data frame;

freeing the location in the RAM immediately after the copying of the data frame to the FIFO buffer of the network interface device regardless of a transmission of the data frame from the node;

attempting to transmit the data frame on the network from the network interface device; and updating statistics counters on the network interface device with transmission status information.

2. The method of claim 1, wherein all transmission status information is maintained in the network interface device.

3. The method of claim 2, wherein the step of freeing the locations in the memory includes issuing an interrupt signal from the network interface device to a central processing unit (CPU) to inform the CPU that the memory location is free.

4. The method of claim 3, further comprising the step of the CPU retrieving transmission status information from the statistics counters of the network interface controller.

5. A network interface device for transferring data frames between a host system random access memory (RAM) and a host computer and a network medium, comprising:

a network interface device having a FIFO buffer memory and interrupt logic configured to issue an interrupt signal to the host computer, the FIFO buffer memory having a size sufficient to store a complete maximum length data frame;

a memory controller configured for transferring the data frames between the host system RAM and the FIFO buffer memory;

transmission logic configured to transmit the data frames from the FIFO buffer memory to the network medium; and statistics counters configured to store transmission status information, wherein the interrupt logic issues the interrupt signal to the host computer when the network interface device receives the data frame in the FIFO buffer memory, the interrupt signal indicating that the FIFO buffer memory has stored the complete data frame allowing the host computer to re-use the location of the data frame in the host system RAM.

6. The network interface device of claim 5, wherein the host system RAM is further configured to store transmit descriptors that indicate length of a respective data frame to be transmitted and the location in the host system RAM of the respective data frame to be transmitted.

7. The network interface device of claim 6, wherein the transmit descriptors are free of transmission status information.

8. The network interface device of claim 7, wherein all of the transmission status information for a data frame is stored in the statistics counters.

9. The network interface device of claim 8, wherein the memory controller is configured to read a transmit descriptor from a host system memory to initiate the transfer of a data frame.

10. The network interface device of claim 9, wherein the memory controller is further configured to read the data frame from the host system memory at the location in the host system memory indicated by the transmit descriptor read by the memory controller.

* * * * *